United States Patent [19]

Hope et al.

[11] 3,776,329

[45] Dec. 4, 1973

[54] BRAKE WEAR AND ADJUSTMENT DEVICE

[75] Inventors: Frederick John Charles Hope, Chobham, Woking; James Malcolm Pigney, Bracknell, both of England

[73] Assignee: Self Energizing Disc Brakes Limited, Datchet, Buckinghamshire, England

[22] Filed: Feb. 15, 1972

[21] Appl. No.: 226,427

[30] Foreign Application Priority Data

Feb. 19, 1971  France.............................. 7109697

[52] U.S. Cl............. 188/1 A, 200/61.44, 340/52 A
[51] Int. Cl........................................... F16d 66/02
[58] Field of Search................. 188/1 A; 200/61.44; 340/52 A

[56] References Cited
UNITED STATES PATENTS

| | | | |
|---|---|---|---|
| 2,087,386 | 7/1937 | Norton......................... | 188/1 A UX |
| 2,146,357 | 2/1939 | Schweikle...................... | 188/1 A X |
| 3,356,188 | 12/1967 | Goldman et al. ............... | 188/1 A X |

Primary Examiner—Duane A. Reger
Attorney—Neil F. Markva et al.

[57]  ABSTRACT

A device for indicating the condition of the brakes of a vehicle is provided which enables the driver to determine whether the brakes are properly adjusted and brake linings are badly worn. The device includes an electrical switch located remotely from the brake lining and which is arranged to be automatically operated to energize an indicator when the lining has worn to a predetermined extent and a second electrical switch which is arranged to be automatically operated when brake adjustment is required. Each of the switches is activatable by variation of a magnetic field.

9 Claims, 6 Drawing Figures

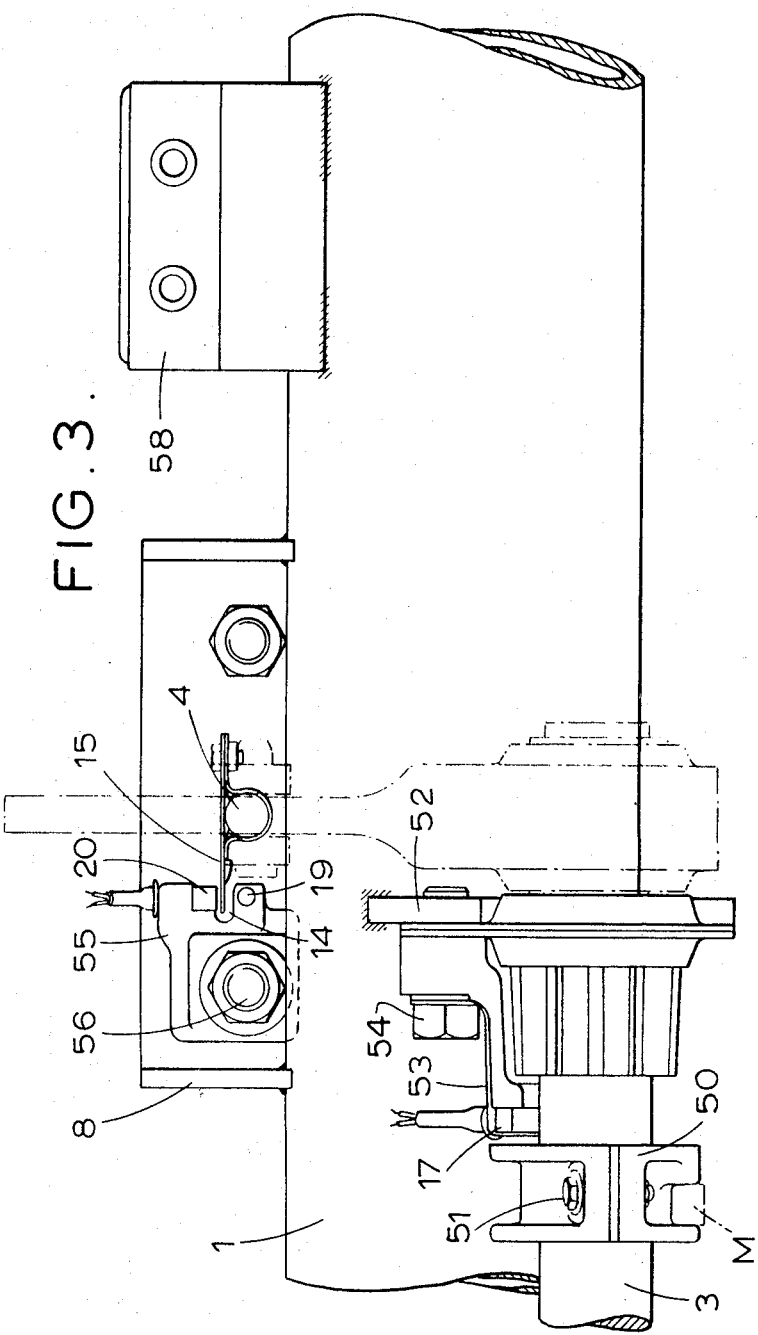

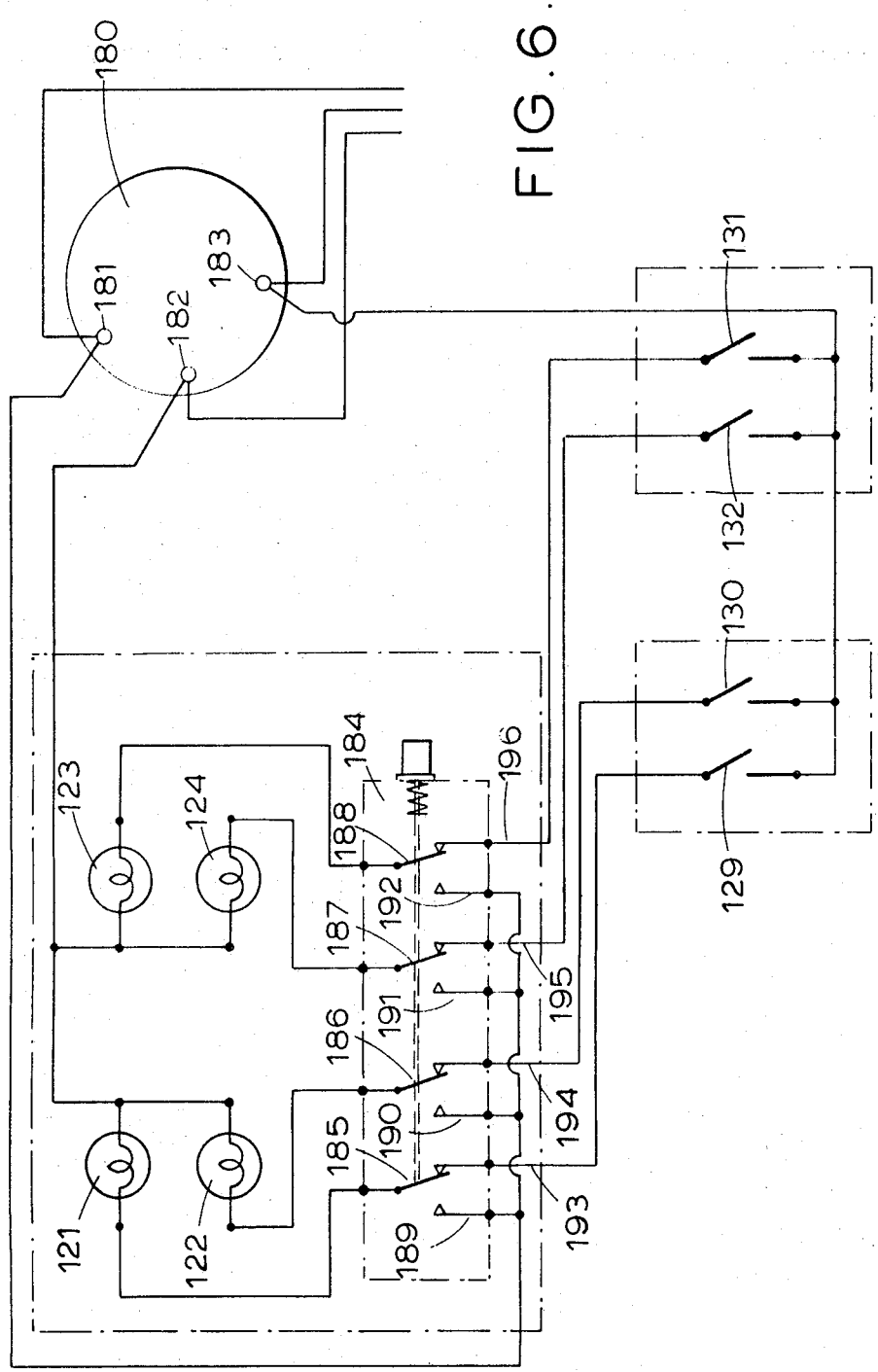

BRAKE WEAR AND ADJUSTMENT DEVICE

BACKGROUND OF THE INVENTION

This invention relates to a device for indicating the operating condition of a vehicle brake.

There is a general need for a simple device which will indicate to the driver of a motor vehicle whether any of the frictional linings of the vehicle brakes are excessively worn or whether adjustment is required. The frictional linings can be linings as used in drum-type brakes and pads as used in disc-type brakes.

Although there is a general requirement for such a device there is a particular requirement for such a device in goods vehicles in which the brakes are subjected to heavy wear due to high mileages. Also in the case of articulated vehicles a particular semi-trailer may be coupled to and hauled by a number of different tractor vehicles and consequently although a driver may know the condition of the brakes of his tractor he is not always aware of the condition of the brakes of a fresh trailer.

It is known to provide a shorting-type contact in the actual frictional lining of a vehicle brake as for example in British Pat. 980,977, filed 25th Sept., 1963 to Maurice Barton. This contact is embedded in the lining and engages the brakedrum to conduct electricity when the lining is worn excessively. This arrangement obviously necessitates modified brake linings and it is more desirable for the device to be usable without involving replacement of brake linings so that it can be used with the existing linings of a vehicle. In addition there is a need for a device which will also indicate the condition of brake adjustment since the situation could arise where the brake linings are satisfactory but the brake operating mechanism is badly out of adjustment.

It is a general object of the invention to provide an improved device which will indicate the operating condition of the brakes of a vehicle.

SUMMARY OF THE INVENTION

According to the invention there is provided a device for indicating the operating condition of a vehicle brake having a frictional lining; said device having an electrical switch located remotely from, i.e. without physical contact with, the brake lining, the switch being automatically operated to energize an indicator when the brake lining has worn to a predetermined extent and an electrical switch which is automatically operated to energize an indicator when brake adjustment is required.

In one form the device includes at least one two-state switch which is electrically connectable to an indicator and which normally exists in a non-conductive first state and is settable into a conductive second state by exposure to a magnetic field produced by a magnetic element, i.e. a permanent or electromagnet, said switch being normally maintained in its non-conductive first state by the presence of an unmagnetised ferromagnetic shielding element. The shielding element for the switch is movable to a non-shielding position when the degree of wear of the frictional lining or extent of travel of operating mechanism for the brake is excessive to enable the device to indicate that the brake requires attention.

The device of the invention is provided with two switches each having an associated magnetic element and shielding element, one of the switches being used to detect wear of the friction lining while the other switch is arranged to detect a requirement for brake adjustment.

In another form, the switch and an associated magnetic element are relatively movable to an extent dependent upon the brake lining wear or the condition of brake adjustment. In this case the shielding element is not required. Although it is preferred to use magnetically actuated switches it is also possible to use switches with engageable contacts relatively movable according to the brake wear or adjustment condition.

In all aspects of the invention electrical conduction through the switches can be used to actuate audible or visual indicators or a combination of both.

BRIEF DESCRIPTION OF THE DRAWINGS

EMbodiments of the present invention will now be described, by way of examples only, with reference to the accompanying drawings, wherein

FIG. 3 is a side view of the arrangement depicted in FIG. 2;

FIG. 6 is a modified circuit diagram for use with a device made in accordance with the invention.

DESCRIPTION OF SPECIFIC EMBODIMENTS

Figure 1:
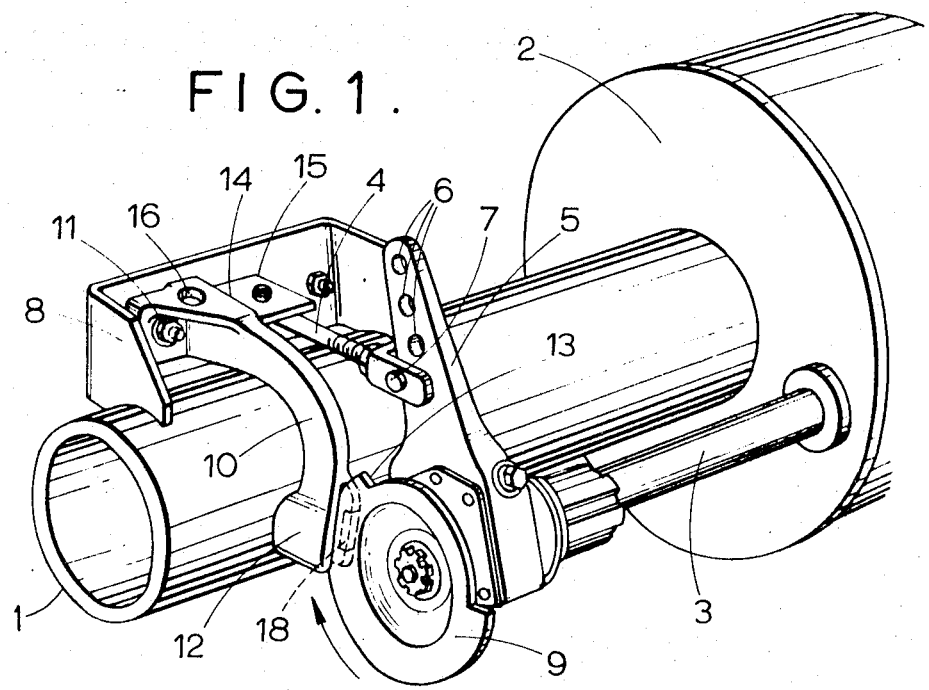
FIG. 1 is a perspective view of part of the operating mechanism of a vehicle brake fitted with a device made in accordance with the invention.

Referring to FIG. 1 of the drawings, the reference numeral 1 denotes the axle housing of the vehicle carrying at one end a brake drum 2. As is common in one popular conventional drum type vehicle brake, the brake is operated by rotation of an "S" cam shaft 3 in a clockwise direction. Rotation of the cam shaft 3 is achieved by movement of the actuating rod 4 which is operated by a hydraulic or pneumatic brake cylinder not shown. The piston rod 4 rotates the cam shaft 3 through an actuating lever 5 which is provided with a series of holes 6 each of which is engageable by a bolt 7 passing through the forked end of the rod 4 in order to adjust the movement of the rod 4 as the friction lining of the brake is worn. A bracket 8 is attached as by welding to the axle housing 1 for supporting the brake operating cylinder and the piston rod 4. As described so far the brake operating mechanism is entirely conventional.

In accordance with the invention, the free end of the cam shaft 3 is fitted with a (mild steel) actuating disc 9 which is secured to the end of the shaft 3 so as to be rotatable therewith. A support member 10 which is moulded from an insulating material, preferably a synthetic plastics material such as PVC or nylon, is attached to the bracket 8 by means of bolts 11. The free end 12 of the support member 10 is bifurcated to allow entry of the periphery of the actuating disc 9. To one inner face of the bifurcated end of the support member 10 is fitted a magnetically operated reed relay switch (not shown). The switch is of a type which has a magnetically polarized contact and one other contact. These contacts are normally in the off, non-contacting, non-conductive condition and are caused to change to the conductive condition by a magnetic field of sufficient field strength. To the opposed inner face of the bifurcated end is disposed a magnetic element 18 which is sufficiently close to the switch to cause polarisation and thereby render the switch conductive. The actuating disc 9 is however manufactured from a ferromagnetic material and when disposed between the magnetic element 18 and the switch as shown in the drawing shields the switch magnetically to an extent sufficient to prevent actuation of the switch. It will be noted however that the disc 9 has a cut-away segment 13. The actuating disc 9 is secured on the end of shaft 3 in such a way that when there is an adequate thickness of friction lining on the brake shoe, the non-cut-away section of the disc 9 extends between the switch and its associated magnetic element 18 in the end 12 of the arm 10 so that the switch is shielded from the magnetic element 18 and is in its non-conductive state. When the brake lining needs replacing, the cut-away section 13 of the disc begins to enter the bifurcated end of the support 10 when the brakes are applied. As soon as the amount of disc extending into the fork becomes insufficient to shield the switch effectively from the field produced by the magnetic element 18, the switch is actuated on application of the brakes and consequently its associated indicator indicates that the particular brake requires relining.

A slot 14 is formed in the support 10 and is of a size such as to accommodate a shielding element in the form of a plate 15 secured to the piston rod 4. The plate 15 is made from a ferromagnetic material, e.g. mild steel. The slot 14 is provided with a magnetic element on one inner face and a switch also of the reed relay type described hereinbefore is positioned on the opposite face. The magnetic force produced by the magnetic element is again sufficient to activate the switch 20. In normal use however the plate 15 extends between the magnetic element and the switch and prevents the switch being activated. Unsatisfactory adjustment of the brakes is indicated by substantial longitudinal movement of the piston rod 4 and the size and position of the plate 15 is arranged so that when brake adjustment is required the plate 15 moves sufficiently on actuation of the brakes to allow the magnet to actuate the switch in the slot 14. Accordingly this renders the switch conductive and results in its associated indicator drawing attention to the requirement for adjustment of the brakes preferably when the driver of the vehicle actually applies the brakes.

A single three pin socket 16 is provided in the support member 10 from which wires to the two switches are encapsulated in the support 10. Although there are two connections to each switch the earth connection is common to both and accordingly only a three pin socket is required.

It will be appreciated that an assembly similar to that described is provided at the other end of the axle housing and similar assemblies are provided for the other axles of the vehicle.

Where two or more of such assemblies are mounted on one axles, one support member 10 can serve as a junction box for both in order to simplify the wiring for the installation of the device.

Installation of the plate 15 is particularly easy because proper location is achieved by pushing the plate 15 up to the bracket 8 when the brakes are off. The plate can then be bolted to the rod 4.

Figure 2:
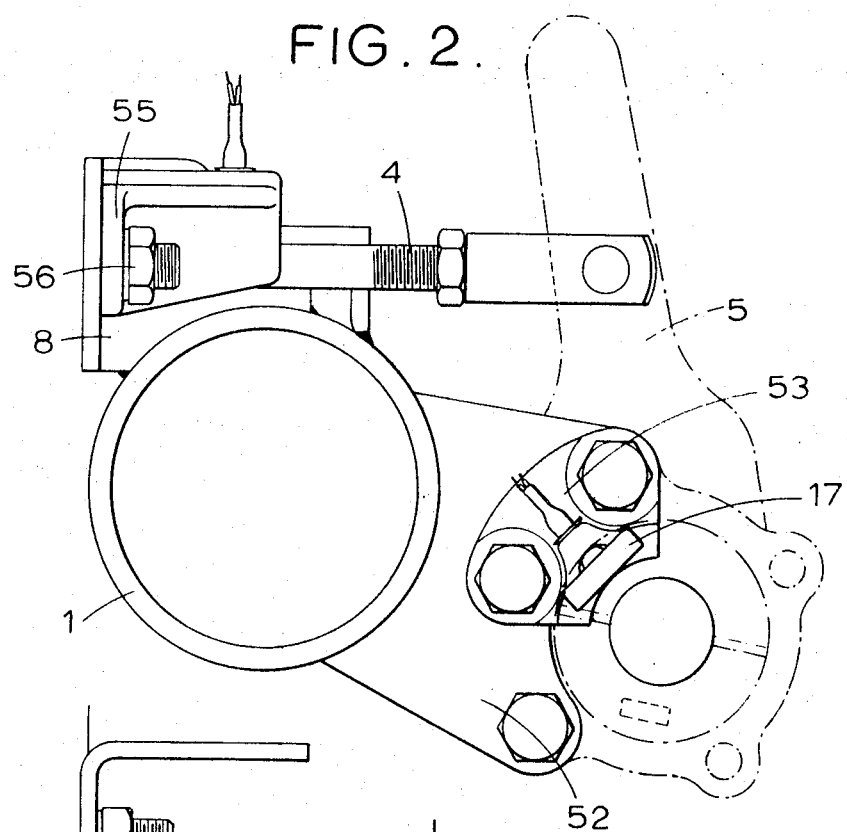
FIG. 2 is an end view of part of the mechanism of a brake fitted with a further device made in accordance with the invention.
Figure 4:
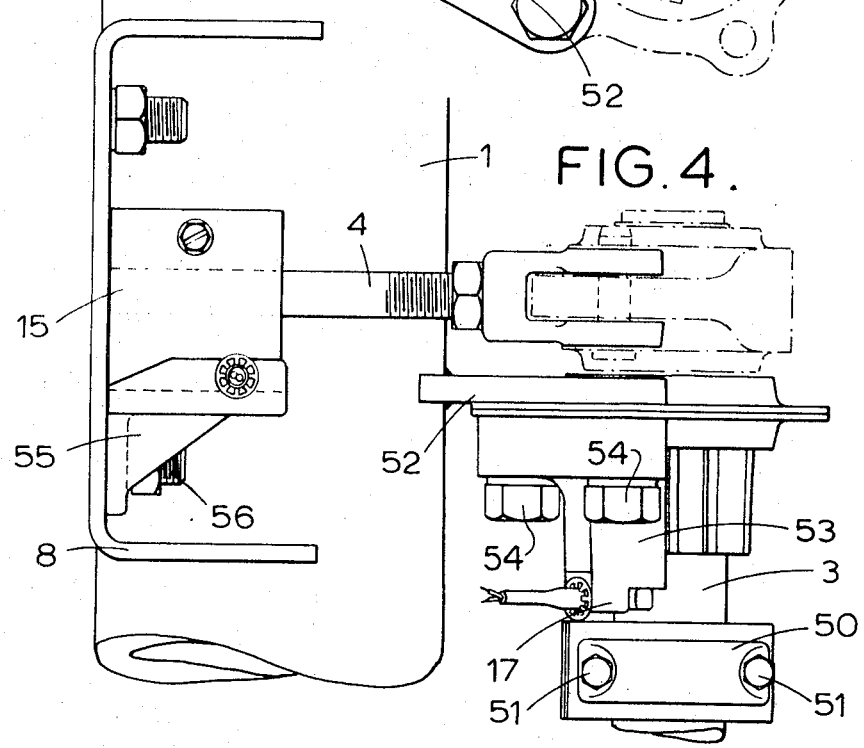
FIG. 4 is a plan view of the arrangement shown in FIGS. 2 and 3.

A further example of a device made in accordance with this invention is depicted in FIGS. 2 to 4 and for convenience like reference numerals have been used to denote the same parts as described in connection with FIG. 1. The basic difference between the device of FIG. 1 and the device of FIGS. 2 to 4 is that, in the latter, the disc 9 is not required in the brake wear indicator. As shown in FIGS. 2 to 4, the cam shaft 3 carries a clamping member in the form of a split ring 50 provided with bolts 51 which supports a magnetic element M. The magnetic element can be supported by the ring 50 in a variety of ways and the magnetic element is thus merely represented diagrammatically in the drawing by the reference M. In this particular axle assembly, the axle housing 1 has a support piece 52 rigidly connected thereto. The support piece 52 serves to support the shaft 3 and in accordance with the invention a further bracket 53 is attached to the support piece 52 by means of bolts 54. This bracket 53 carries a reed-relay type switch 17 which operates as generally described in connection with FIG. 1.

The clamping member or split ring 50 is adjusted relative to the shaft 3 so that the magnetic element M will not normally become sufficiently close in position to the non-movable switch 17 to cause the latter to change to its conductive state providing the associated brake lining is of adequate thickness. When, however, the brake lining needs renewing the pivotal movement of the shaft 3 will be sufficiently great to bring the magnetic element M close enough to the switch 17 to cause the latter to change to its conductive state.

The brake adjustment indicator for this assembly operates as described in connection with FIG. 1 and differs therefrom only in that a further bracket 55 is attached to the bracket 8 by means of a bolt 56 and supports a magnetic element 19 and an associated switch 20 separated by the slot 14. As before, the plate 15 attached to the rod 4, normally extends between the components 19 and 20.

In case of the embodiment of FIGS. 2 to 4, a junction box 58 for the wiring of the switches is attached to the axle housing 1.

Figure 5:
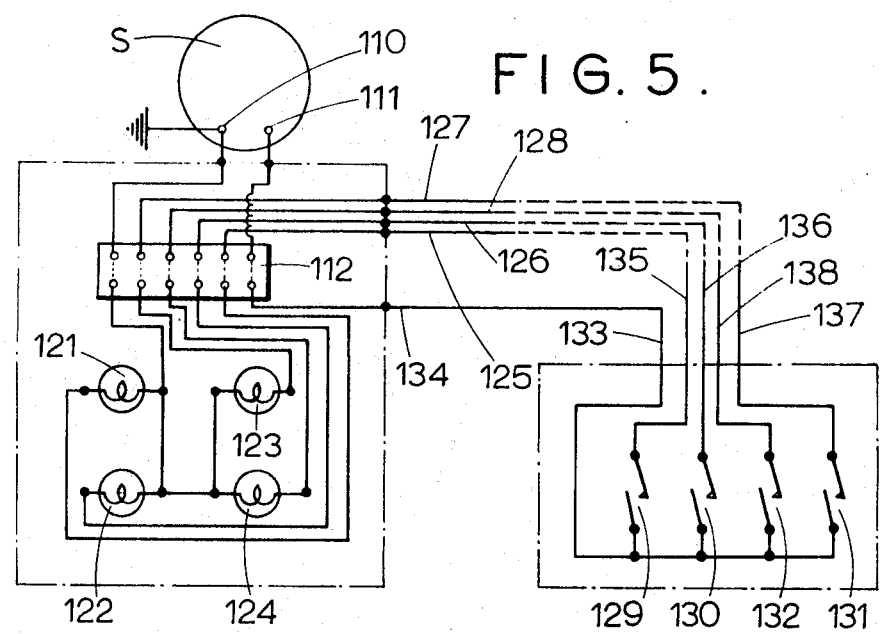
FIG. 5 is a circuit diagram for use with a device made in accordance with the invention.

The circuitry associated with the device can be appreciated from consideration of FIG. 5.

Referring to FIG. 5, there is shown a circuit diagram associated with a device made in accordance with the invention. As shown, an electrical power source for the indicators operated by the device is constituted by the stop lights of the vehicle. The stop light S has a negative pole 110 grounded to the vehicle chassis, or in the form of an ground return cable, and a positive pole 111 energized only when the vehicle brakes are applied. The electrical power source for the indicators is, therefore, only available when the vehicle brakes are actually applied, and this is more convenient than having the power source available at all times. The various electrical leads associated with the device are connected to the terminals of a tag board 112. Four indicator lamps 121, 122, 123, and 124 are mounted on a panèl disposed in the driving cab of the vehicle. One terminal of each lamp 121 to 124 is connected to the pole 110 via the tag board terminals. The other terminal of each lamp 121 to 124 is connected to leads 125 to 128 respectively via tag board terminals. The leads 125 to 128 are connected via leads 135 to 138, respectively, to the movable contacts of two-state switches 129 to 132, respectively. The switches 129 to 132 would correspond to the reed relay switches described in connection with FIGS. 1 to 4 or the other form of switches discussed above. The switches 129 and 130 are operatively associated with one brake of a trailer for example and the switches 131, 132 are operatively associated with the other brake of the trailer. The fixed contacts of the switches 129 to 132 are connected to the positive pole 111 via leads 133 and 134.

The indicator lamps 122 and 124 are for indicating the state of brake adjustment and can be conveniently colored amber. The switches 130 and 132 associated with the lamps 122 and 124 are constructed and arranged, such as is hereinbefore explained, so that the movable contact of each switch closes to enerize the lamp 122 or 124 when brake adjustment is required. Similarly the lamps 121 and 123 are for indicating brake wear and can be conveniently colored red. The switches 129, 131 associated with the lamps 121, 123 are arranged in any suitable manner, such as in hereinbefore explained, so that the movable contact of each switch closes to energize the lamp 121 or 123 when the braking lining of its associated brake is worn to a predetermined extent.

The panel on which the lamps 121 to 124 are carried is disposed so that the lamps are visible to a driver. Thus by merely glancing at the lamps when the vehicle brake pedal is depressed, the driver can tell immediately whether any of the brakes of the trailer to which he is coupled has badly worn linings or needs adjustment. The electrical leads 125 to 128 can be connected to the leads 135 to 138 respectively, and the connections to the stop light made, by way of the usual electrical connection which is established when a trailer is coupled to a tractor, i.e. by way of the service lines.

It may be desirable to incorporate some means of testing the indicators so as to avoid the situation where a faulty indicator would not register brake wear or incorrect brake adjustment. If the indicators where hydbrid indicators giving both a visual and audible indication the failure of one type of indicating function would probably not preclude the other indicating function from performing correctly. Nevertheless, a simple testing means may be desirable and such a means is shown in FIG. 6 of the accompanying drawings where a schematic circuit diagram is illustrated.

A junction box 180 has three terminals or connections 181, 182, 183 of which 181 would perhaps be a trailer rear light positive pole, 183 would be the trailer stop light positive pole and 182 would be the earthed negative pole. A 4 pole change over switch 184 has four movable contacts 185 to 188 and two sets of fixed contacts 189 to 192 and 193 to 196. The switch is biased with a spring so that the movable contacts 185 to 188 engage the contacts 193 to 196. The indicator lamps 121 to 124 and associated switches 129 to 132 are as described hereinbefore. The lamps 121 to 124 are connected to their respective elements 129 to 132 by way of the movable contacts 185 to 188 engaging the fixed contacts 193 to 196 in the normal condition and the device operates as described hereinbefore. The contacts 189 to 192 of the switch 184 are connected to the terminal 181. When it is desired to test the indicators 121 to 124 the switch actuating member is depressed to cause the movable contacts 185 to 188 to engage the contacts 189 to 192. In this condition the indicators 121 to 124 are all energised and should light up provided the pole 181 carries a voltage which is the case when the vehicle lights are switched on. Thus, by momentary depressing the actuating member of the switch 184 a driver can see immediately whether any of the indicators are faulty.

We claim:

1. A device for indicating the operating condition of a vehicle brake assembly mounted on an axle housing and having a brake lining and a cam shaft operated by a piston rod, said device comprising:
   a. a first electrical switch located remotely from and without physical contact with the brake lining,
   b. said first switch being automatically operated to energize an indicator when the brake lining has worn to a predetermined extent,
   c. a second electrical switch which is automatically operated to energize an indicator when brake adjustment is required,
   d. at least one of said switches is associated with a magnetic element,
   e. said switch and magnetic element being non-movable with respect to each other,
   f. a shielding element attached to said cam shaft so that it is movably mounted with respect to said switch and magnetic element to an extent dependent upon the brake lining wear or the condition of brake adjustment to control the magnetic field produced by the magnetic element and acting on the switch, and
   g. a bi-furcated support member attached to said axle housing,
   h. said associated switch and magnetic element being carried by said bi-furcated support.

2. A device as defined in claim 1 wherein a further shielding element is attached to the operating piston rod, a bracket is attached to said axle housing, and a further associated switch and magnetic element are carried by said bracket.

3. An indicating device for use in a vehicle brake drum assembly having a brake mounted on an axle housing and operated by movement of an actuating rod and rotation of a cam shaft, said indicating device comprising:
   a. a first electrical indicator means,
   b. a first electrical switch electrically connected to to said first indicator means and being activatable by variation of a magnetic field,
   c. said first electrical switch being arranged to be activated by excessive movement of said brake actuating rod whereby said first indicator means is energized automatically when brake adjustment is required,
   d. a second electrical indicator means, and
   e. a second electrical switch activatable by variation of a magnetic field,
   f. said second electrical switch being located outside the brake drum and being arranged to be activated by excessive angular movement of said cam shaft whereby said second indicator means is energized automatically when the brake lining is unduly worn.

4. An indicating device as defined in claim 3 wherein at least one of said first and second electrical switches is associated with a magnetic element, said switch and said magnetic element being movable with respect to each other by an extent dependent upon either the brake lining wear or the condition of brake adjustment.

5. An indicating device as defined in claim 4 wherein the magnetic element is attached to the cam shaft of the brake drum assembly so as to be adjustable relative thereto and said switch being fixedly attached to said axle housing.

6. An indicating device as defined in claim 3 wherein at least one of said first and second electrical switches is associated with a magnetic element, said switch and said magnetic element being non-movable with respect to each other, a shielding element being movably mounted with respect to said switch and said magnetic element to an extent dependent upon the brake lining wear or the condition of brake adjustment to control the magnetic field produced by the magnetic element and acting on the switch.

7. An indicating device as defined in claim 6 wherein said shielding element is attached to said cam shaft of the brake drum assembly, the associated switch and magnetic element being carried by a bi-furcated support member attached to said axle housing.

8. An indicating device as defined in claim 7 wherein a further shielding element is attached to said actuating rod of the brake drum assembly, an associated switch and magnetic element are each carried by a bracket attached to said axle housing.

9. An indicating device as defined in claim 3 wherein at least one of said first or second switches includes relatively movable contacts which only engage one another to energize the associated indicator means when the brake lining or brake adjustment of said brake drum assembly require attention.

* * * * *